United States Patent [19]

Akashi

[11] Patent Number: 4,800,261

[45] Date of Patent: Jan. 24, 1989

[54] APPARATUS FOR DETECTING FOCUSING STATE OF OBJECTIVE LENS

[75] Inventor: Akira Akashi, Yokohama, Japan

[73] Assignee: Canon Kabushiki Kaisha, Tokyo, Japan

[21] Appl. No.: 936,734

[22] Filed: Dec. 2, 1986

[30] Foreign Application Priority Data

Dec. 5, 1985 [JP] Japan .................. 60-272562

[51] Int. Cl.$^4$ .................................................. G01J 1/36
[52] U.S. Cl. ................................... 250/204; 250/201; 354/408
[58] Field of Search ................ 250/201, 204; 354/402, 354/404, 408, 409

[56] References Cited

U.S. PATENT DOCUMENTS 4,394,569  7/1983  Nakamura ........................... 250/204
4,540,881  9/1985  Hayashi et al. ...................... 250/204
4,573,784  3/1986  Suzuki ................................ 354/408

*Primary Examiner*—Edward P. Westin
*Assistant Examiner*—Khaled Shami
*Attorney, Agent, or Firm*—Fitzpatrick, Cella, Harper & Scinto

[57] ABSTRACT

Light intensity distributions of object images whose relative positions vary with a focusing state of an objective lens are formed by a lens assembly based on light fluxes transmitted through the objective lens, and the distributions are sensed by sensing devices having a plurality of photo-sensors to produce first and second signals for the respective light intensity distributions. The first and second signals are processed by relatively displacing the first and second signals under a first relationship and by relatively displacing the first and second signals under a second relationship different from the first relationship to determine a relative positional relationship of the light intensity distributions. If there is identical or essentially identical portion is found in the processing of the first signal and the second signal, the previous processing result is utilized to shorten the processing time.

5 Claims, 6 Drawing Sheets

APPARATUS FOR DETECTING FOCUSING STATE OF OBJECTIVE LENS

BACKGROUND OF THE INVENTION

1. Field of the Invention

The present invention relates to an improvement in a focusing state detection system which detects a focusing state by a relative positional relationship of two images of an object.

2. Related Background Art

In a prior art focus state detection apparatus for a camera, an exit pupil of an imaging lens is divided into two pupil areas and relative positional displacement of two images formed by light fluxes transmitted through the pupil areas are observed to determine an in-focus state. For example, Japanese Laid-open Patent Application Nos. 118019/1980 and 155331/1985 disclose a secondary focusing system in which a spatial image formed on a predetermined focus plane (corresponding to a film plane) by two secondary focusing optical systems is guided to two sensor planes so that relative positional displacement of the two images is detected.

The secondary focusing type focusing state detection apparatus is shown in FIG. 4. A field lens 3 is arranged coaxially with an optical axis 2 of an imaging lens 1 whose focusing state is to be detected. Two secondary focusing lenses 4a and 4b are arranged behind the field lens 3 symmetrically with respect to the optical axis 2. Photo-electric conversion element arrays 5a and 5b are arranged behind the lenses 4a and 4b. Diaphragms 6a and 6b are arranged in the vicinity of the secondary focusing lenses 4a and 4b. The field lens 3 essentially focuses an exit pupil of the imaging lens 1 onto pupil planes of the two secondary focusing lenses 4a and 4b. As a result, light fluxes applied to the secondary focusing lenses 4a and 4b correspond to those light fluxes which are emitted from non-overlapping equi-space areas on the exit pupil plane of the imaging lens 1, corresponding to the secondary focusing lenses 4a and 4b. When a spatial image formed in a vicinity of the field lens 3 is refocused on the planes of the photo-electric conversion element arrays 5a and 5b by the secondary focusing lenses 4a and 4b, the positions of the two images on the photo-electric conversion element arrays 5a and 5b change in accordance with the displacement of the spatial image along the optical axis. FIG. 5 shows this. In FIG. 5A which shows an in-focus state, the two images are positioned at the centers of the photo-electric conversion element arrays 5a and 5b, in FIG. 5B which shows a near-focus state, the two images are moved away from the optical axis 2, and in FIG. 5C which shows a far-focus state, the two images are moved toward the optical axis 2. This image intensity distribution is photo-electrically converted and the converted electrical signal is processed to detect a relative positional deviation of the two images. In this manner, the focus state of the imaging lens 1 can be detected.

Methods for processing the photo-electrically converted signal from the photo-electric conversion element arrays 5a and 5b are disclosed in Japanese Laid-open Patent Application No. 142306/1983 (U.S. Pat. No. 4,559,446) and U.S. Pat. No. 4,333,007. Specifically, the following formula is operated for $k_1 \leq k \leq k_2$ (for example, $k_1 = -N/2$, $k_2 = N/2$).

$$\begin{aligned} V(k) &= \sum_{i=0}^{M-1} A(i) \Box B(i + |K| + 1) - \sum_{i=0}^{M-1} A(i + 1) \\ & \quad \Box B(i + |k|) \qquad (k < 0) \\ &= \sum_{i=0}^{M-1} A(i + k) \Box B(i + 1) - \sum_{i=0}^{M-1} A(i + k + 1) \\ & \quad \Box B(i) \qquad (k \geq 0) \\ &= V_1(k) - V_2(k) \end{aligned} \qquad (1)$$

where N is the number of photo-electric conversion elements of the photo-electric conversion element array 5a or 5b, A(i) and B(i) are image signals from the i-th elements of the photo-electric conversion element arrays 5a and 5b, and M is the number of pixels processed ($M = N - |k| - 1$). $A(i) \Box B(j)$ is an operator for A(i) and B(j). For example, $$A(i) \Box B(j) = |A(i) - B(j)| \qquad (2)$$

$$A(i) \Box B(j) = |A(i) - B(j)|^n \qquad (3)$$

$$A(i) \Box B(j) = \max[A(i), B(j)] \qquad (4)$$

$$A(i) \Box B(j) = \min[A(i), B(j)] \qquad (5)$$

The formula (2) represents an absolute value of a difference between A(i) and B(i), the formula (3) represents accumulated product, the formula (4) represents a larger one of A(i) and B(j), and the formula (5) represents a smaller one. By the above definition, $V_1(k)$ and $V_2(k)$ can be considered as correlation amounts in a broad sense. From the formula (1), $V_1(k)$ represents the correlation amount at a displacement $(k-1)$ and $V_2(k)$ represents the correlation amount at a displacement $(k+1)$. Accordingly, an evaluation amount $V(k)$ which is the difference between $V_1(k)$ and $V_2(k)$ represents a change of correlation amount of the image signals A(i) and B(i) at a relative displacement k. Since a change is zero at the peak of the correlation amount, it is assumed that the peak of the correlation amount exists in a section $[k, k+1]$ represented by $$V(k) \cdot V(k+1) < 0 \qquad (6)$$

and $V(k)$ and $V(k+1)$ are interpolated to detect the deviations of the image signals A(i) and B(i). FIG. 6 shows the image signals A(i) and B(i) for the two images formed when the number of photo-electric elements is 16 (N=16). There is a deviation of P. FIG. 7 shows the evaluation amount $V(k)$ of the formula (2) when the relative displacement k is changed within a range of $-N/2 \leq k \leq N/2$. As described above, $V(k)$ and $V(k+1)$ which meet $V(k) \cdot V(k+1) < 0$ are linearly interporated to detect the deviation P. FIG. 8 shows a relationship between the image signals A(i) and B(i) when the evaluation amount $V(k)$ is calculated while the relative displacement k changes in a range of $-3 \leq k \leq 3$. Hatched areas show the photo-electric conversion elements which are subject of the correlation.

Because the operation of the evaluation amount $V(k)$ is done by correlation, the number of steps of operation increases as a function of $N^2$, where N is the number of photo-electric conversion elements. As a result, as the number N increases, the correlation operation time increases and the focus state detection time increases.

SUMMARY OF THE INVENTION

It is an object of the present invention to reduce a processing time so that a focusing state detection time is significantly shortened.

It is another object of the present invention to determine a first correlation amount for each relative displacement by utilizing a second correlation amount previously determined for other relative displacement so that common portions of correlation processing may be omitted.

DETAILED DESCRIPTION OF THE PREFERRED EMBODIMENTS

Figure 3:
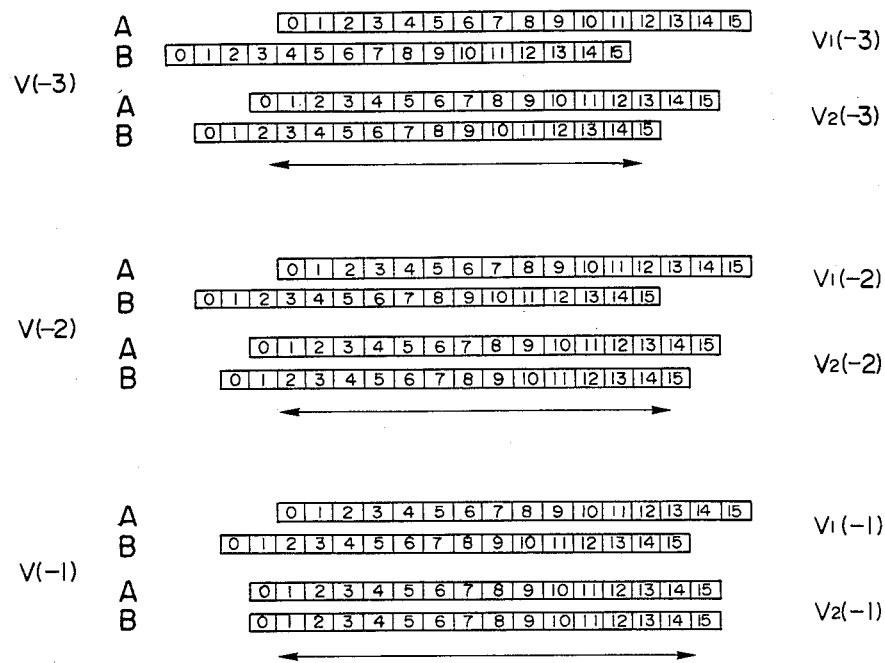
FIG. 3 illustrates a processing method.
Figure 8:
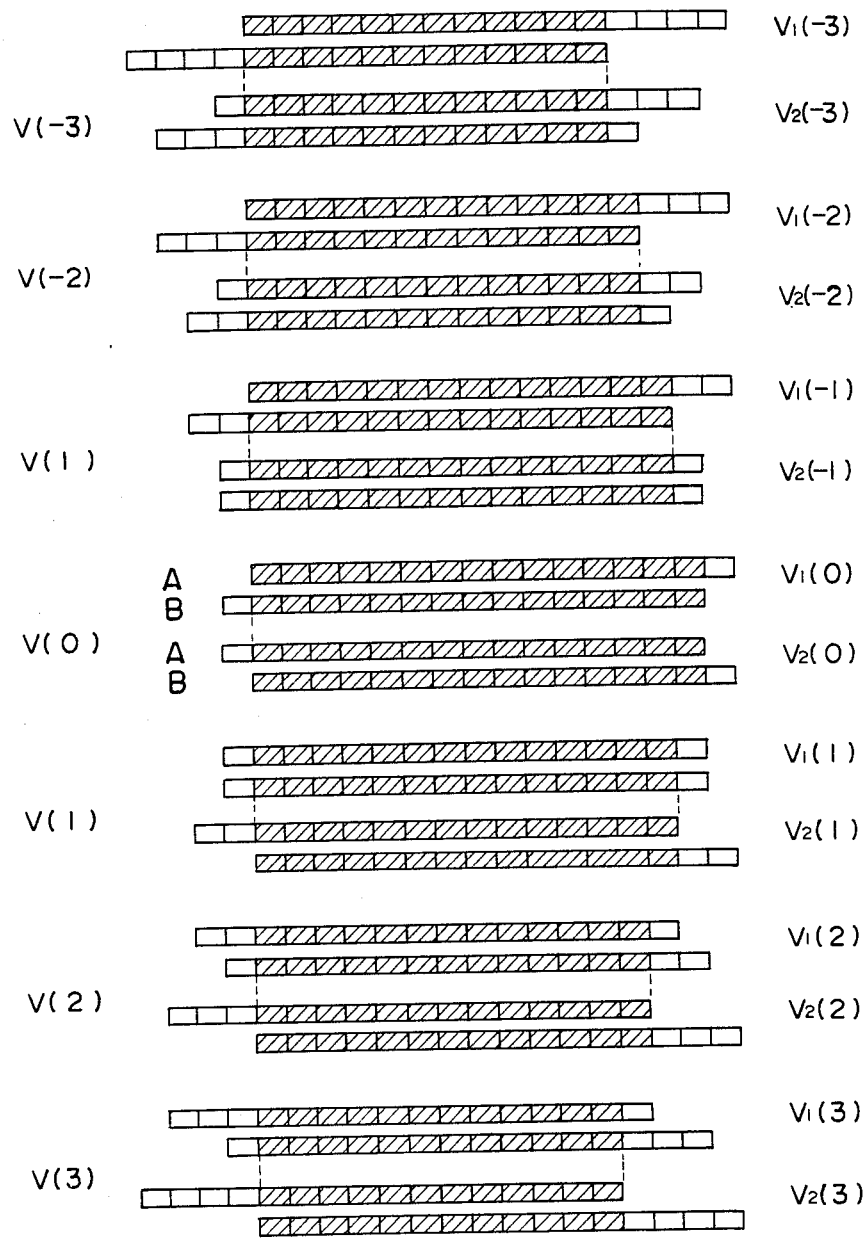
FIG. 8 shows a relationship between two images in focusing state detection processing in the secondary focusing system.

In a process of calculating $V(k) = V_1(k) - V_2(k)$ for each relative displacement k, the processing of $V_1(k)$, for example, may utilize $V_2(k-2)$ which has been processed for the relative displacement $(k-2)$ in order to shorten the processing time for the evaluation amount $V(k)$. This is explained with reference to FIG. 8. The correlation processing of $V_1(-1)$ for determining the evaluation amount $V(-1)$ is almost identical to the correlation processing of $V_2(-3)$ for determining the evaluation amount $V(-3)$, and the correlation processing of $V_1(1)$ for determining the evaluation amount $V(1)$ is identical to the correlation processing of $V_2(-1)$ for determining the evaluation amount $V(-1)$. In this manner, the processing of $V_1(k)$ is identical or almost identical to the correlation processing of $V_2(k-2)$ which has been done two pixel displacements before. Thus, the identical portions are not processed again but the previous results are utilized. This is more fully explained with reference to FIG. 3. As shown, $$V_2(-3) = \sum_{i=0}^{11} A(i+1) \square B(i+3)$$

$$= A(1)\square B(3) + A(2)\square B(4) + \ldots$$

$$+ A(12)\square B(14)$$

Because $V(-1) = V_1(-1) - V_2(-1)$, then $$V_1(-1) = \sum_{i=0}^{13} A(i)\square B(i+2)$$

$$= A(0)\square B(2) + A(1)\square B(1) + \ldots$$

$$+ A(13)\square B(15)$$

$$= A(0)\square B(2) + V_2(-3) + A(13)\square B(15)$$

Accordingly, the correlation amount $V_1(-1)$ is a sum of the correlation amount $V_2(-3)$ and $A(0)\square B(2)$ and $A(13)\square B(15)$. Thus, the processing of the correlation amount $V_1(k)$ is attained by adding only two terms to the correlation amount $V_2(k-2)$, and the processing of the evaluation amount $V(k)$ can be carried out almost in a time necessary to calculate the correlation amount $V_2(k)$. When the evaluation amount $V(k)$ is to be calculated for k which is within a range of $k_1 \leq k \leq k_2$, the correlation amounts $V_2(k_1-2)$ and $V_2(k_1-1)$ for the relative displacements $(k_1-2)$ and $(k_1-1)$ are previously processed. Thus, the evaluation amount $V(k)$ can be calculated in essentially one half the number of steps.

The above processing is equivalent to calculating and storing $V_1(k)$ for k which is within the range of $k_1 \leq k \leq k_2$, but the latter is disadvantageous in cost and circuit configuration. In the former method, it is necessary to store only $V_2$ which is two pixel displacements before and hence no large capacity memory is required to attain the shortening of the processing time.

Figure 2:
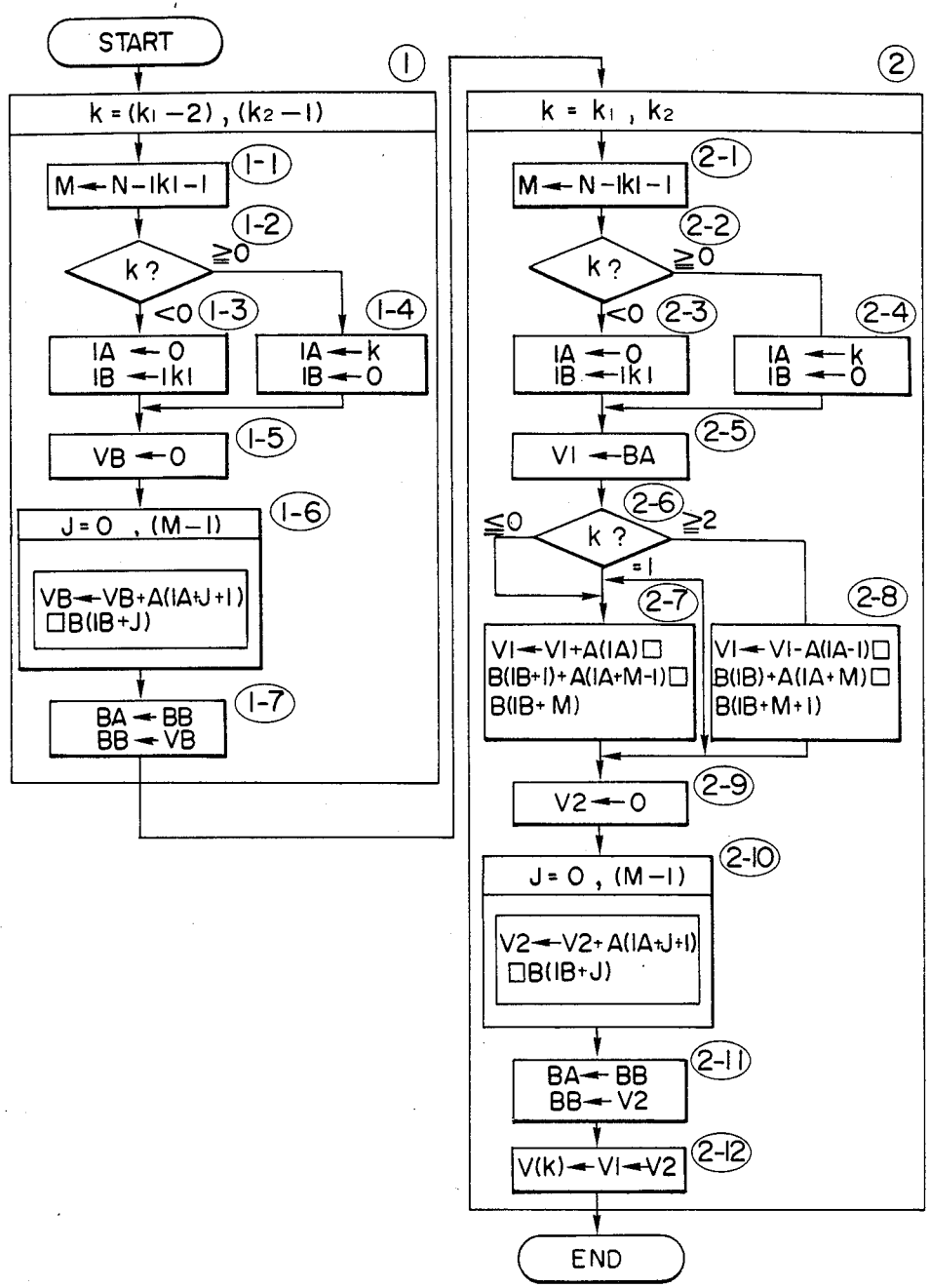
FIG. 2 shows a flow chart of an embodiment of the present invention.

A method for detecting a deviation of two images by using the above processing method is explained with reference to a flow chart of FIG. 2.

In a step 1, the correlation amounts $V_2$ for the relative displacements $(k_1-2)$ and $(k_1-1)$ are calculated. Loop calculation is carried out in a block over the relative displacement $(k_1-2)$ to $(k_1-1)$.

(Step 1-1) Determine the number M of pixels to be processed (corresponding to the hatched area in FIG. 8) based on the relative displacement k.

(Step 1-2) Check a sign of the relative displacement k.

(Step 1-3) If $k < 0$, set $iA = 0$, $iB = |k|$, where iA and iB are processing start addresses for images A and B, as shown in the formula (1). Namely, the image B is displaced.

(Step 1-4) If $k \geq 0$, set $iA = |k|$, $iB = 0$. In this case, the image A is displaced.

(Step 1-5) Set a process variable VB to "0".

(Step 1-6) For a processing relative address J which is within a range of 0 to $(M-1)$, execute $$VB \leftarrow VB + A(iA+J+1)\square B(iB+J)$$

(Step 1-7) At this point, the processing variable VB is equal to $V_2(k)$. A content of a work area BB which contains the process result before one pixel displacement is transferred to a work area BA which contains the process result before two pixel displacement, and the processing variable VB is transferred to the work area BB.

At the end of the step 1, the work area BA contains the correlation amount $V_2(k_1-2)$ and the work area BB contains the correlation amount $V_2(k_1-1)$.

In a step 2, the evaluation amount $V(k)$ is calculated for the relative displacement k $(k_1 \leq k \leq k_2)$.

(Step 2-1) to (Step 2-4) Same as the Step 1-1 to Step 1-2.

(Step 2-5) The pre-processed content of the work area BA is transferred to the processing variable $V_1$.

The correlation amount $V_2$ for the relative displacement $(k-2)$ has been stored in the work area BA.

(Step 2-6) Check the relative displacement k. If $k=1$, it means that the correlation amount $V_1$ has already been determined.

(Step 2-7) If $k \leq 0$, add $A(iA) \square B(iB+1)$ and $A(iA+M-1) \square B(iB+M)$ to the processing variable V1 to determine the correlation amount $V_1(k)$ for the relative displacement k.

(Step 2-8) If $k \geq 2$, subtract $A(iA-1) \square B(iB)$ and $A(iA+M) \square B(iB+M+1)$ from the processing variable V1, as opposed to the step 2-7, to determine the correlation amount $V_1(k)$ for the relative displacement k.

(Step 2-10) For the processing relative address J $(0 \leq J \leq M-1)$, execute $$V2 \leftarrow V2 + A(iA+J+1) \square B(iB+J)$$

(Step 2-11) At this point, the processing variable V2 is equal to $V_2(k)$. The content of the work area BB is transferred to the work area BA, and the processing variable V2 is transferred to the work area BB. Thus, the work area BA contains the correlation amount $V_2(k-2)$ and the work area BB contains the correlation amount $V_2(k-1)$, for the next relative displacement k.

In this manner, the processing time can be reduced to substantially one half of the processing time required when the formula (1) is processed for each relative displacement k. The deviation P of the two images can be determined based on the evaluation amount V(k).

Figure 1:
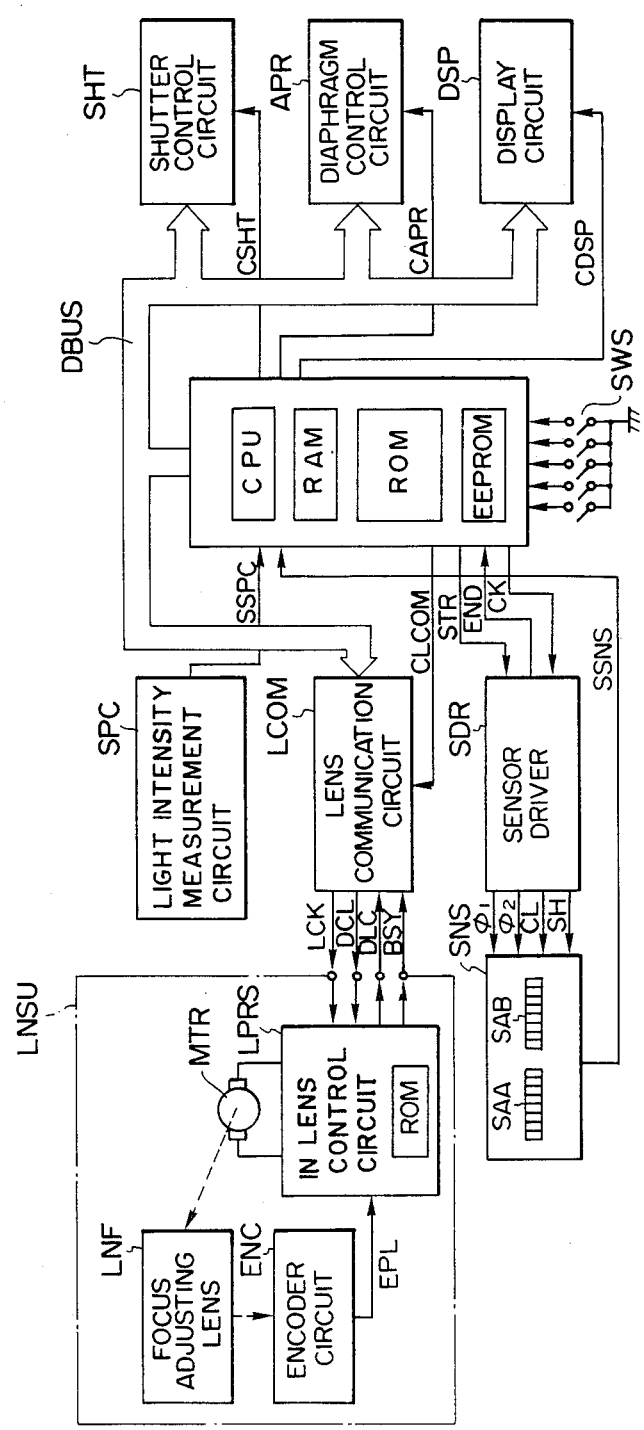
FIG. 1 shows a block diagram of one embodiment of a focusing state detection apparatus of a camera in accordance with the present invention.

FIG. 1 shows a block diagram of an embodiment of a focusing state detection apparatus for a camera in accordance with the present invention. PRS denotes a control circuit of the camera which proceeds the correlation processing in accordance with the procedure shown in FIG. 2 to detect the deviation P of a pair of light intensity distributions of object images, that is, the focusing state in order to control the focusing of the imaging lens. It may be a one-chip microcomputer which contains CPU, RAM, ROM, EEPROM (electrically erasable programmable ROM) and input/output ports. The ROM and EEPROM store a series of controlling softwares and parameters including those for AF control. DBUS denotes a data bus, SHT denotes a shutter control circuit which accepts data supplied from the data bus DBUS while a control signal CSHT is supplied thereto from the control circuit PRS and controls the drive of a shutter leading curtain and trailing curtain in accordance with the input data. APR denotes a diaphragm control circuit which accepts data supplied from the data bus DBUS while the control signal CAPR is applied thereto and controls a diaphragm mechanism (not shown) in accordance with the input data. DSP denotes a display circuit which accepts data supplied from the data bus DBUS while the control signal CDSP is applied thereto and displays imaging information based on the input data. SWS denotes a group of switches such as release switch, continuous photographing mode switch and information setting switches.

SPC denotes a light intensity measurement circuit. An analog light intensity signal SSPC from the circuit SPC is supplied to the control circuit PRS where it is A/D converted for use as light intensity data to control the shutter control circuit SHT and the diaphragm control circuit APR. LCOM denotes a lens communication circuit which accepts data supplied from the data bus DBUS while the control signal CLCOM is applied thereto and serially communicates with a lens unit to be described later in accordance with the input data. It transmits data DCL for driving the lens in synchronism with a clock signal LCK to an in-lens control circuit to be described later and serially receives from the in-lens control circuit, lens information DLC such as current position of the imaging lens. BSY denotes a signal to inform to the camera that the imaging lens is moving. When this signal is present, the serial communication is not undertaken.

LNSU denotes the lens unit, and LPRS denotes the in-lens control circuit for driving a motor MTR in accordance with the serial input data DCL to move the imaging lens LNF. It includes a ROM which stores a focal distance of the imaging lens LNF and an open F value. ENC denotes an encoder which detects a pulse signal generated as a lens body tube which holds the imaging lens LNF is moved and supplies to the in-lens control circuit LPRS a current position signal of the imaging lens LNF. SDR denotes a sensor drive circuit for controlling a line sensor SNS such as DDC sensor having two sensor lines SAA and SAB in accordance with the input signals from the control circuit PRS. The sensor lines SAS and SAB may be two sections of one sensor line.

The operation is now described. Since the operation of the shutter control circuit SHT, diaphragm control circuit APR, display circuit DSP and light intensity measurement circuit SPC is not directly related to the present invention, the explanation thereof is omitted.

Figure 4:
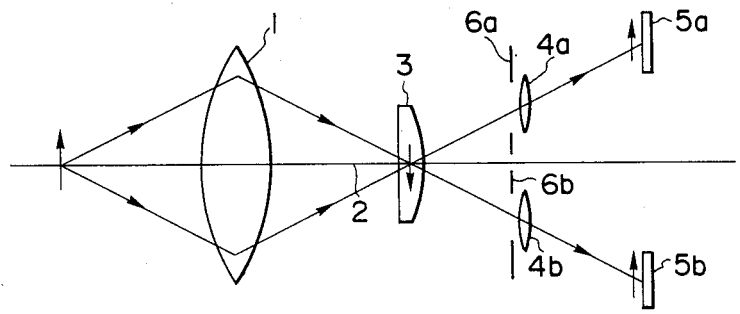
FIG. 4 shows an arrangement of an optical system of a conventional secondary focusing type focusing state detection apparatus.
Figure 5A:
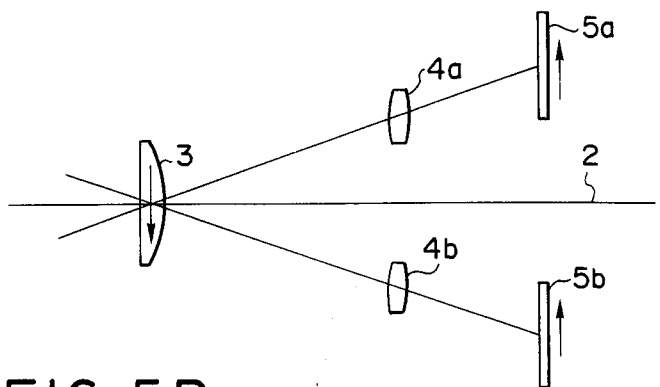
FIGS. 5A, 5B and 5C show relationships between a focusing state in the secondary focusing system and an image deviation.
Figure 5B:
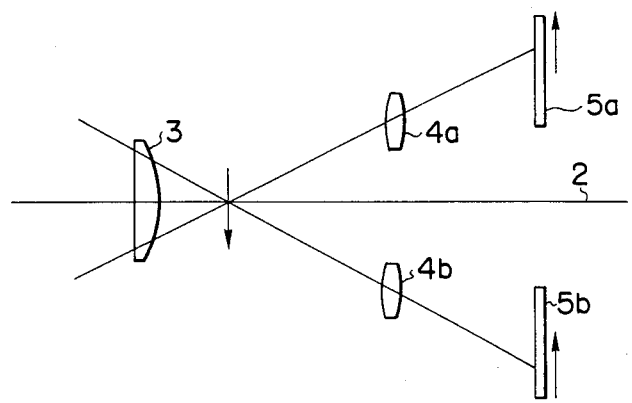
Figure 5C:
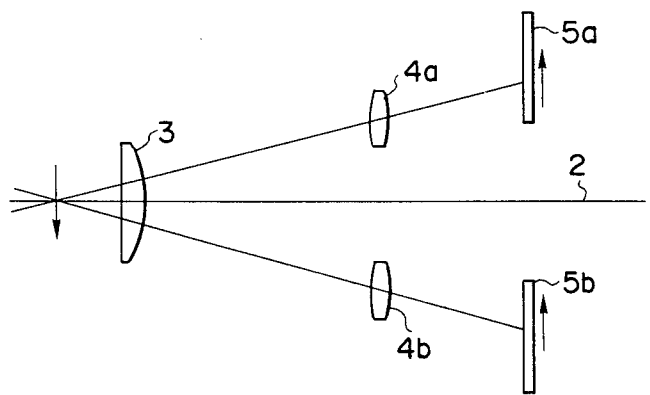
Figure 6:
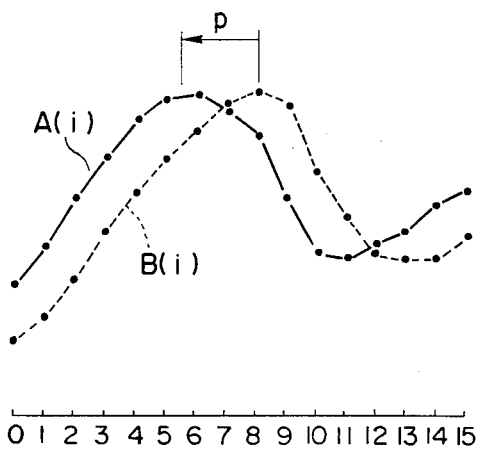
FIG. 6 shows image signals produced by two sensor arrays in the secondary focusing system.
Figure 7:
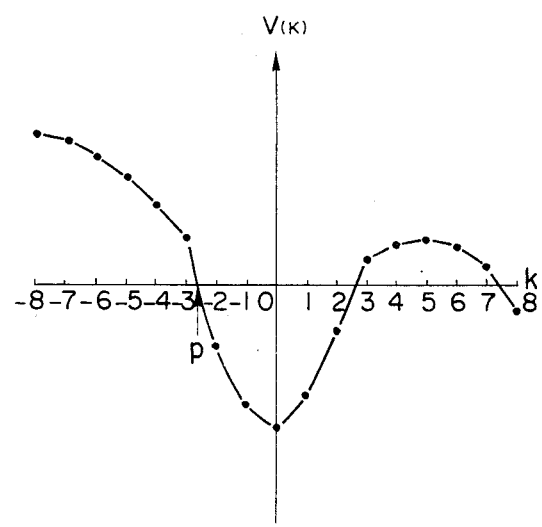
FIG. 7 shows a change of evaluation amount in the secondary focusing system.

The control circuit PRS checks the state of the release switch of the switch group SWS and if it detects that the release switch has been actuated, it starts a series of focusing operations. It first supplies a start of storage signal STR and drives the photo-electric converter SNS through the sensor drive circuit SDR to produce image signals A(i) and B(i) for the light intensity distributions of the two images. The operation of the control circuit PRS, sensor drive circuit SDR and line sensor SNS is briefly explained below. When the control circuit PRS generates the start of storage signal STR, the sensor drive circuit SDR supplies a clear signal CL to the line sensor SNS to clear charges of the photo-electric converters of the sensor lines SA and SAB. Then, the line sensor SNS starts photo-electric conversion of light images formed on the sensor lines SAA and SAB by the secondary focusing lenses (which are not shown in FIG. 1 but are arranged as shown in FIG. 4) and to store the charges. After a predetermined time period since the start of the above operation, the sensor drive circuit SDR supplies a transfer signal SH to the line sensor SNS to transfer the charges stored in the photo-electric converter to the CCD. The sensor drive circuit SDR also supplies an end of storage signal END to the control circuit PRS and waits for a CCD drive clock CK to be supplied from the control circuit PRS. When the CCD drive clock CK is supplied, the sensor drive circuit SDR generates CCD drive signals $\phi 1$ and $\phi 2$ and supplies them to the line sensors SNS. The line sensor SNS, when it receives those signals, supplies the analog image signal SSNS to the control circuit PRS. Thus, the control circuit PRS A/D converts the analog image signal SSNS in synchronism with the CCD drive clock CK and stores the converted image signals A(i) and B(i) of the light intensity distributions of the two images in predetermined addresses in the RAM.

After the image signals A(i) and B(i) of the light intensity distributions of the two images have been stored, the control circuit PRS carries out the focusing state detection processing to detect the focusing state of the imaging lens LNF. This information is sent to the lens communication circuit LCOM by the control signal CLCOM through the data bus DBUS. If a signal BSY is not supplied, the lens communication circuit LCOM determines that the imaging lens LNF is now in a stopped condition and supplies the focusing state information sent from the control circuit PRS to the in-lens control circuit LPRS, that is, supplies the data DCL in synchronism with the clock signal LCK. It also receives the lens information DLC from the in-lens control circuit LPRS. This information includes parameters such as conditions of the imaging lens LNF and is used for the imaging operation of the camera. On the other hand, the in-lens control circuit LPRS drives the motor MTR in accordance with data supplied from the camera to move the imaging lens LNF to a position corresponding to the data, that is, until the number of encoder pulses EPL supplied from the encoder ENC reaches the number specified by the data. While the motor MTR is driven, the signal BSY is supplied to the camera.

In this manner, the series of focusing state detection operation is completed.

The processing method of the present invention is not limited to the correlation processing shown by the formulas (2)–(5) but it may be applicable to broad correlation processing between two signals.

In accordance with the present invention, the first correlation amount to be determined for each relative displacement is determined by utilizing the second correlation amount previously determined for other relative displacement so that the correlation processing which is same as that previously done is omitted. As a result, the processing time is shortened and the focusing state detection time is significantly shortened.

What I claim is:

1. An apparatus for detecting a focusing state of an objective lens comprising:
    optical means for receiving light fluxes transmitted through an objective lens and forming light intensity distributions based on an object whose relative position varies with a focusing state of the objective lens,
    sense means having a plurality of photo-sensors for sensing the light intensity distributions to produce first and second signals for the respective light intensity distributions; and
    processing means for manipulating the first and second signals to sequentially and relatively displace the first and second signals under a first relationship to determine a first correlation amount $V_1(k)$, manipulating the first and second signals to sequentially and relatively displace the first and second signals under a second relationship to determine a second correlation amount $V_2(k)$, subtracting the second correlation amount from the first correlation amount to determine an evaluation amount $V(k)$, calculating the evaluation amount for each relative displacement, and calculating the relative position of the light intensity distributions based on the evaluation amounts to produce a signal indicating the focusing state of the objective lens;
    said processing means calculating one of the first and second correlation amounts by utilizing another correlation amount previously calculated for another relative displacement.

2. An apparatus for detecting a focusing state of an objective lens according to claim 1, wherein said processing means calculates the first correlation amount for each relative displacement by utilizing the second correlation amount previously calculated for other relative displacement.

3. An apparatus for detecting a focusing state of an objective lens according to claim 1, wherein the evaluation amount $V(k)$, first correlation amount $V_1(k)$ and second correlation amount $V_2(k)$ meet the following relationship:

$$\begin{aligned} V(k) &= V_1(k) - V_2(k) \\ &= \sum_{i=0}^{M-1} A(i) \square B(i + |k| + 1) - \sum_{i=0}^{M-1} A(i+1) \\ & \square B(i + |k|) \qquad (k < 0) \\ &= \sum_{i=0}^{M-1} A(i+k) \square B(i+1) - \sum_{i=0}^{M-1} A(i+k+1) \\ & \square B(i) \qquad (k \geq 0) \end{aligned}$$

where $M = N - |k| - 1$ is the number of pixels processed, N is the number of photo-sensors used to sense one of the light intensity distributions, $A(i)$ is the first signal, $B(i)$ is the second signal, and $i = 0, \ldots N-1$.

4. An apparatus for detecting a focusing state of an objective lens according to claim 1, wherein said optical means includes secondary focusing lenses having parallel optical axes.

5. A method for detecting a focusing state of an objective lens comprising the steps of:
    forming light intensity distributions based on an object whose relative position varies with a focusing state of the objective lens, based on light fluxes transmitted through the objective lens;
    sensing the light intensity distributions by sensing means having a plurality of photo-sensors to form first and second signals for the respective light intensity distributions; and
    manipulating the first and second signals to relatively displace the first and second signals under a first relationship and to relatively displace the first and second signals under a second relationship different from the first relationship to produce a signal for indicating the focusing state of the objective lens based on the relative displacement of the light intensity distributions;
    the calculation for one relative displacement utilizing a calculation result previously obtained for an identical or essentially identical portion under another relationship.

* * * * *

UNITED STATES PATENT AND TRADEMARK OFFICE
CERTIFICATE OF CORRECTION

PATENT NO. : 4,800,261
DATED : January 24, 1989
INVENTOR(S) : AKIRA AKASHI

It is certified that error appears in the above-identified patent and that said Letters Patent is hereby corrected as shown below:

On the title page:

IN [57] ABSTRACT

Line 14, "is" should be deleted.

COLUMN 2

Line 56, "porated" should read --polated--.

COLUMN 6

Line 22, "sensor lines SAS and SAB" should read --sensor lines SAA and SAB--.
    Line 42, "sensor lines SA" should read --sensor lines SAA--.
    Line 58, "line sensors SNS." should read --line sensor SNS.--.

UNITED STATES PATENT AND TRADEMARK OFFICE
CERTIFICATE OF CORRECTION

PATENT NO. : 4,800,261

DATED : January 24, 1989

INVENTOR(S) : AKIRA AKASHI

Page 2 of 2

It is certified that error appears in the above-identified patent and that said Letters Patent is hereby corrected as shown below:

COLUMN 8

Line 12, "other" should read --another--.

Signed and Sealed this

Fourteenth Day of August, 1990

Attest:

HARRY F. MANBECK, JR.

*Attesting Officer*

*Commissioner of Patents and Trademarks*